(12) United States Patent
Szyperski et al.

(10) Patent No.: US 7,860,900 B2
(45) Date of Patent: Dec. 28, 2010

(54) CONSISTENTLY SIGNALING STATE CHANGES

(75) Inventors: Clemens A. Szyperski, Redmond, WA (US); Geoffrey M. Kizer, Seattle, WA (US); Joshua R. Williams, Seattle, WA (US); John D. Doty, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 363 days.

(21) Appl. No.: 12/037,004

(22) Filed: Feb. 25, 2008

(65) Prior Publication Data

US 2009/0216793 A1     Aug. 27, 2009

(51) Int. Cl.
*G06F 7/00* (2006.01)
*G06F 17/30* (2006.01)

(52) U.S. Cl. .................. 707/804; 707/806; 707/812; 719/318

(58) Field of Classification Search ......... 707/600–831; 717/120–122, 144, 154; 709/217, 219; 719/318
See application file for complete search history.

(56) References Cited

U.S. PATENT DOCUMENTS

| | | | |
|---|---|---|---|
| 5,317,734 A | 5/1994 | Gupta | |
| 5,808,625 A | 9/1998 | Picott et al. | |
| 6,256,712 B1 | 7/2001 | Challenger et al. | |
| 6,538,651 B1 | 3/2003 | Hayman et al. | |
| 6,817,019 B1 | 11/2004 | Wang et al. | |
| 7,100,095 B2 | 8/2006 | Godse et al. | |
| 7,133,874 B2* | 11/2006 | Hill et al. ........................ | 1/1 |
| 7,415,706 B1* | 8/2008 | Raju et al. .................. | 717/170 |
| 2003/0014513 A1 | 1/2003 | Ruths et al. | |
| 2004/0024807 A1 | 2/2004 | Cabrera et al. | |
| 2004/0193678 A1* | 9/2004 | Trufinescu et al. .......... | 709/203 |
| 2004/0268302 A1* | 12/2004 | Srivastava et al. ........... | 717/108 |
| 2007/0162903 A1* | 7/2007 | Babb et al. .................. | 717/154 |

OTHER PUBLICATIONS

Jalili et al., Operating system support for object dependencies in persistent object stores, 1994, IEEE, 18-25.*
Grossman et al., Caching and migration for multilevel persistent object stores, 1995, IEEE, 127-135.*
Kountouris et al., Hierarchical conditional dependency graphs for conditional resource sharing, 1998, IEEE, vol. 1, 313-316.*

(Continued)

*Primary Examiner*—Jean B. Fleurantin
(74) *Attorney, Agent, or Firm*—Workman Nydegger

(57) ABSTRACT

A signaling system of the present invention provides a synchronized approach to delivering, reporting, and/or otherwise processing status changes in a software dependency chain. In a first phase, the signaling system identifies all dependencies between software components, and further sets a binary indicator of each node in a first representation. After identifying any changes in a source node, the system (e.g., a value is updated), the system updates each binary indicator to a second setting. In a second phase, the system initiates all listeners in the dependency chain in an essentially progressive order from source node, to intermediate node, and end-node, etc. Once all listeners have had a chance to perform one or more processes based on the updated value, the system can discard the dependency graph, allowing a new dependency graph to be built for subsequent value changes.

19 Claims, 3 Drawing Sheets

OTHER PUBLICATIONS

"Using Directed Graphs to Describe Entity Dependency in Stable Distributed Persistent Stores," by Rasool Jalili and Frans A. Henskens, Copyright IEEE 1995, Proceedings of the 28th Hawaii International Conference on System Sciences (HICSS'95), pp. 665-674, [online] [retrieved on Feb. 11, 2008] Retrieved from the Internet: http://csdl2.computer.org/comp/proceedings/hicss/1995/6935/00/69350665.pdf.

"On Using the Observer Design Pattern," by Constantin Szallies, Energotec Gmbh, Germany, Aug. 21, 1997, pp. 1-10 [online] [retrieved on Feb. 11, 2008]. Retrieved from the Internet: http://www.wohnklo.de/patterns/observer.html.

"Algorithmic Analysis of the Impacts of Changes to Object-Oriented Software," by Michelle Lee, A. Jefferson Offutt and Roger T. Alexander, 34th International Conference on Technology of Object-Oriented Languages and Systems (Tools USA '00), Aug. 2000, pp. 61-70 [online] [retrieved on Feb. 11, 2008]. Retrieved from the Internet: http://www.cs.colostate.edu/~rta/publications/tools00.pdf.

\* cited by examiner

CONSISTENTLY SIGNALING STATE CHANGES

CROSS-REFERENCE TO RELATED APPLICATIONS

N/A

BACKGROUND

Background and Relevant Art

Application programs used within computerized systems typically include a number of different components or modules that depend on each other for various different reasons. For example, a simple calculator application program might include an output display component, which immediately refreshes (i.e., displays new output) any time it identifies one or more values output from a calculation module. The calculation module, in turn, might be configure to execute a calculation any time it receives one or more number and function inputs from one or more input components. Thus, the display component would be dependent not only on the calculation module, but also ultimately on each of the various input components in the calculator application.

There are a number of different ways these dependencies can be configured on a software level. For example, the above-described calculator module might "publish" its calculated values so that any other display component that is "listening" for the value will identify and execute some action on the value when published. To identify when the value is published, the display component might, in turn, establish a listener (e.g., establish an "event"), which ultimately identifies and/or receives the published value. In other cases, the calculator module might itself be configured to pass (e.g., "signaling") any newly calculated value to a particular other component that is registered with the calculator module. Thus, one will appreciate that there are a number of "push" and "pull"-style mechanisms for transferring data from one software component to another.

Thus, any time a programmer wants to create a dependency between modules or components, the programmer will typically need to write a dependency in the code, and sometimes even create a listener for the relationship. For example, the programmer might write a listener that not only retrieves a value when it is published by one component, but also sends the value on to another component in a dependency chain. The programmer might also or alternatively write in other logic whereby the component only sends the value onward when some particular condition is satisfied (e.g., the value is of a particular size). As a result, one will appreciate that each listener in a chain of components may process values in different ways, and with different speeds.

While this ability to write logic into each listener can provide for some programming flexibility, it can also result in dependency chains that are inordinately complex, and/or for which the accuracy thereof is difficult to guarantee. For example, a complex dependency chain could have many different listeners that each respond to effectively the same changes in one or more source nodes differently, and at different rates. This can result in a race condition for subsequent components in the dependency chain. In particular, a dependent child that is dependent on two components that received a value from the same source could end up processing a correctly updated value from one parent component, but execute again using an out of date value. Alternatively, the dependent child component might end up hanging indefinitely due to a condition that is likely to never occur. This could have still further ripple effects down the dependency chain.

In addition to the foregoing, with conventional systems, the same dependencies between software components may be used even where a more direct route for receiving information may be preferable. For example, one dependency chain might involve a dependency from source node A, to intermediate node C, and then to end-node D. In other cases, however, node A may only need a value from end-node D. For example, in the second execution context end-node D may only need to know that source node A has changed, without necessarily needing the value of source node A right away. In most cases, even the second execution context would still involve relay of the actual value of the change from A to C to D, even though D only needs to know that A changed. In a long dependency chain, particularly one with several different conditions involved, there would be a large, unnecessary delay simply for end-node D to find out that source node A has changed.

Some conventional mechanisms for overcoming these problems involve simply encoding frequent refresh rates into each of the different listeners. Although effective in some cases, one will appreciate that this can be computationally expensive, and unnecessary, particularly where a large number of listeners might be involved. For example, some underlying source components in a dependency chain may change often, while other underlying components may change rarely or infrequently. In addition, some other components may not even be involved in a particular output, and so taking the trouble to pass (and calculate) values at such end-nodes would be particularly unnecessary. For example, cells on a spreadsheet that only represent final values but are not otherwise currently in display on a display screen, may not need to be updated until those cells are within view.

Performing a one-size fits all approach can often therefore be unnecessary. Furthermore, the inefficiency tends to abound in present systems since it is often the case that dependencies are registered twice, and since there are few guarantees that upstream listeners necessarily handle some data before other downstream listeners. While these types of issues might not be a problem for small numbers of components that change infrequently, these types of issues can unnecessarily slow or hang up a system with lots of continually changing, displayed data (e.g., processing stock ticker data). Furthermore, such issues can result in unresponsive components, or other unnecessary processing delays.

Accordingly, there are a number of difficulties associated with reporting value changes in complex software dependencies that can be addressed.

BRIEF SUMMARY

Implementations of the present invention provide systems, methods, and computer program products that ensure a synchronized approach to delivering, reporting, and/or otherwise processing status/value changes in complex software dependency chains. In particular, implementations of the present invention include a two-phase approach in which the system establishes a node graph corresponding to dependency chain of software components, and only calls all listeners in the node graph after all nodes have been signaled. Thus, and since listeners can be called in dependency chain order, implementations of the present invention can ensure that all listeners receive values based on effectively the same state for the relevant source components, and in appropriate order, thus ensuring consistency.

For example, a method in accordance with an implementation of the present invention for processing a consistent set of one or more values in dependency chain can involve creating a plurality of nodes corresponding to a plurality of components that include one or more source components and one or more dependent components that are ordered in a dependency chain. The method can also involve, for each node, setting a binary indicator to a first setting that indicates that one or more source components comprise an initial status. In addition, the method can involve, upon identifying a change to a subsequent status in the one or more source components, setting each binary indicator for each node to a second setting. Furthermore, the method can involve calling one or more listeners that have been registered with the created plurality of nodes. In this case, the one or more listeners are synchronized to execute based on the subsequent status in the one or more source components.

In addition, another method in accordance with an implementation of the present invention for creating and updating in-memory data structures based only on a set of guaranteed values can involve creating an initial node graph. The initial node graph corresponds to a plurality of components that include one or more dependent component that depend from one or more source components. In this case, each node of the initial node graph is set to a first setting. The method can also involve, upon identifying that the one or more source components have changed to an updated value, caching the updated value, and initiating all listeners registered for the initial node graph to perform processing based on the updated value. In addition, the method can involve discarding the initial node graph after all initiated listeners have finished processing based on the updated value. Furthermore, the method can involve creating a subsequent node graph based on one or more subsequent changes to the one or more source components.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Implementations of the present invention extend to systems, methods, and computer program products that ensure a synchronized approach to delivering, reporting, and/or otherwise processing status/value changes in complex software dependency chains. In particular, implementations of the present invention include a two-phase approach in which the system establishes a node graph corresponding to dependency chain of software components, and only calls all listeners in the node graph after all nodes have been signaled. Thus, and since listeners can be called in dependency chain order, implementations of the present invention can ensure that all listeners receive values based on effectively the same state for the relevant source components, and in appropriate order, thus ensuring consistency.

As will be understood more fully herein, these and other advantages can be enabled at least in part using two-phase notification, and at-most-once notification delivery. In addition, a directed notification graph, as described herein, provides state change notifications in dependence order (as indicated by graph shape). In particular notification of state change (without necessarily passing the changed value) only happens after the program can correctly determine that all out of date nodes are out of date. Thus, notification only happens once for a given node (which addresses cycles). As a result, these and other aspects of the present invention can be understood to provide reasonable assumptions about dependent state, and can help to maintain guarantees of the system in multi-threaded environments.

Figure 1A:
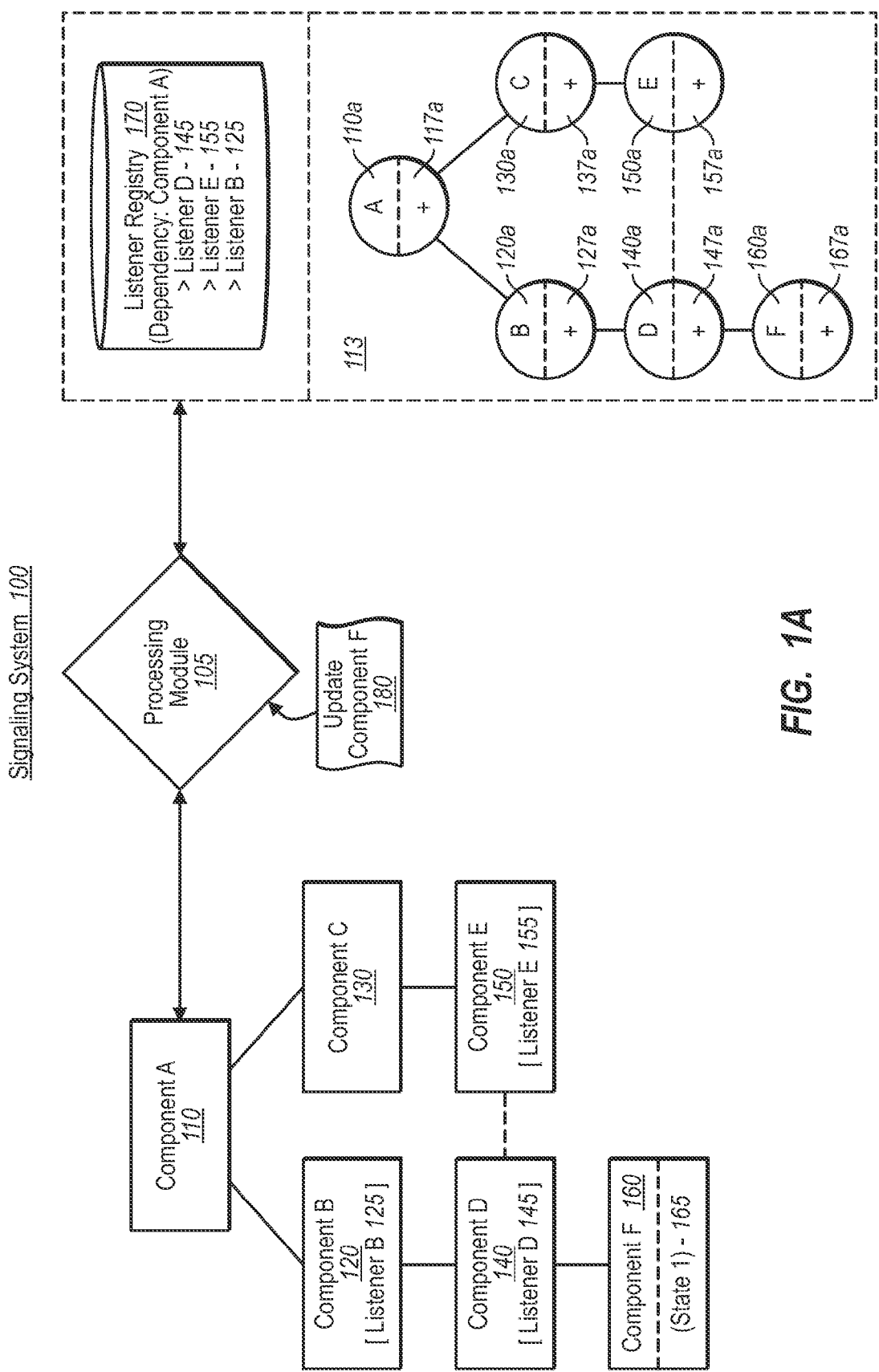
FIG. 1A illustrates an overview schematic diagram in which a signaling system identifies nodes of a dependency chain in accordance with an implementation of the present invention.

FIG. 1A illustrates an overview schematic diagram in which a signaling system 100 prepares a node graph for at least one set of dependent software components in a dependency chain, in order to ensure consistent signaling. For example, FIG. 1A shows that system 100 comprises components A 110, B 120, C 130, D 140, E 150, and F 160. In addition, FIG. 1A shows that component A 110 depends on component B 120, and component C, while component B 120 depends on component D 140 and component C depends from component E 150. Furthermore, FIG. 1A shows that component D 140 depends from component F 160, and that component D and component E are conditionally related to each other. For example, component E might only compute a value if a value coming out of component D is of a certain size or length, etc.

Thus, this set of software components A-F can be thought of generally as forming a "dependency chain," which comprises a plurality of source, dependent, and or end-nodes. In this particular example, component F 160 can be understood essentially as a source node in the dependency chain. By contrast, components B, C, D, and E can be understood essentially as intermediate nodes, and component A can be understood a dependent node of the dependency chain.

Of course, one will also appreciate, however, that any given node in a dependency chain can be considered a dependent node, an intermediate node, or a source node with respect to another node in the dependency chain. For example, component D 140 can be considered a source node to component B 120 and/or to component E 150. Similarly component E 150 can be considered a source node to component C 130 and so forth. In addition, one will appreciate that the illustrated dependency chain could be lengthened, shortened, and made more or less complex at virtually any time depending on various execution contexts. For example, component A could comprise an output module for one particular calculation that involves components B-F in one calculation, but involves more or fewer such component nodes in other calculations.

FIG. 1A shows that system 100 can prepare a node graph 113 corresponding to (or otherwise representing) the dependency chain of software components. In general, node graph 113 comprises a set of in-memory data structures having linked nodes (110a, 120a, 130a, 140a, 150a, and 160a) that are created and discarded based on state changes in relevant software components (e.g., 110, 120, 130, 140, 150, 160). For example, upon request for some processing by component A, processing module 105 traverses each software component 110, 120, 130, 140, 150, 160 in a dependency chain for the particular request, and prepares a corresponding node graph 113. In particular, FIG. 1A shows that processing module 105 prepares a node graph 113 comprising nodes 110a, 120a, 130a, 140a, 150a, and 160a, which correspond respectively to components 110, 120, 130, 140, 150, and 160.

In addition to node graph 113, FIG. 1A shows that processing module 105 also registers each of the different listeners for each software component in a listener registry 170. For example, upon traversing the various components 110, 120, 130, etc. to identify dependencies, each component can also provide an indication of a particular listener. Processing module 105 can then register each identified listener in a listener registry when identified, and thus in the approximate or exact order in the dependency chain. For example, FIG. 1A shows that components B 120, D 145, and E 155 each use a listener, such as listeners B 125, D 145, and E 155, respectively. Accordingly, FIG. 1A shows that listener registry 170 comprises a representation for listener D 145, listener E 155, and listener B 125 in relative dependency chain order.

In any event, system 100 can create and discard node graph 113 to reflect and administer changes in software component state. For example, processing module 105 may have created this particular node graph 113 when source node F equals a value (e.g., "0", or "state 1" 165). When source node F changes from a first state to another subsequent state or value (e.g., from "0" to "10"—not shown), system 100 (e.g., via processing module 105) can then update the node graph 113 to reflect there mere fact that the change has occurred. The system 100 can then hold the node graph 113 in this particular state until such time as all components have had a chance to finish any desired processing. Once the various components 110, 120, 130 finish processing the change in source node that initially caused the change to node graph 113, processing module 105 can then discard node graph 113, and start over with a new such node graph as necessary. As a result, system 100 essentially forbids the corresponding nodes from receiving a new update in state while the components 110, 120, 130 are processing the prior change (e.g., the change from "0" to "10").

This consistency and unity in processing in the software component is enabled at least in part using one or more signaling features in accordance with implementations of the present invention. For example, FIG. 1A shows that each of the various nodes 110a, 120a, etc. of node graph 113 comprises (or is prepared with) a binary indicator, such as binary indicators 117a, 127a, 137a, 147a, 157a and 167a. In this particular illustration, the binary indicator is shown as a "+" sign to identify a particular initial or first setting. Specifically, a "+" sign in the illustrated case means the default value of a given software source component (e.g., component 160, state 165) for which the dependency chain is based, and before any changes have been processed.

Thus, and as appreciated more fully herein, node graph 113 can be set up so that a change in binary indicators is linked to a particular state for an original source node. For example, as soon as the change in state of component F 160 was received (i.e., message 180), system 100 can cache the new value (e.g., changed from "0" to "10"), and automatically link the new value to node graph 113, regardless of any other subsequent changes that might occur with source component F 160. Furthermore, system 100 can link any subsequent change to the value of the source component (e.g., component F 160) to a new (or refreshed) node graph (not shown) at such time as required.

Figure 1C:
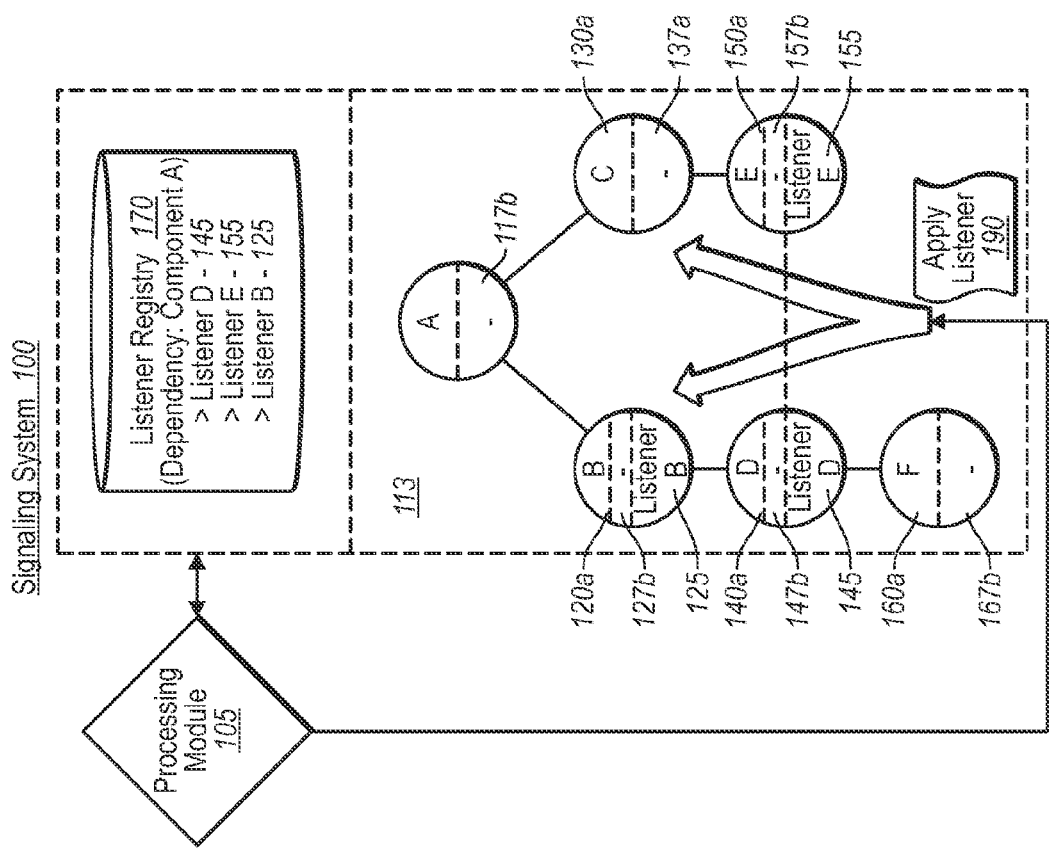
FIG. 1C illustrates an overview schematic diagram in which the signaling system calls listeners after signaling the nodes in a dependency chain in accordance with an implementation of the present invention.
Figure 1B:
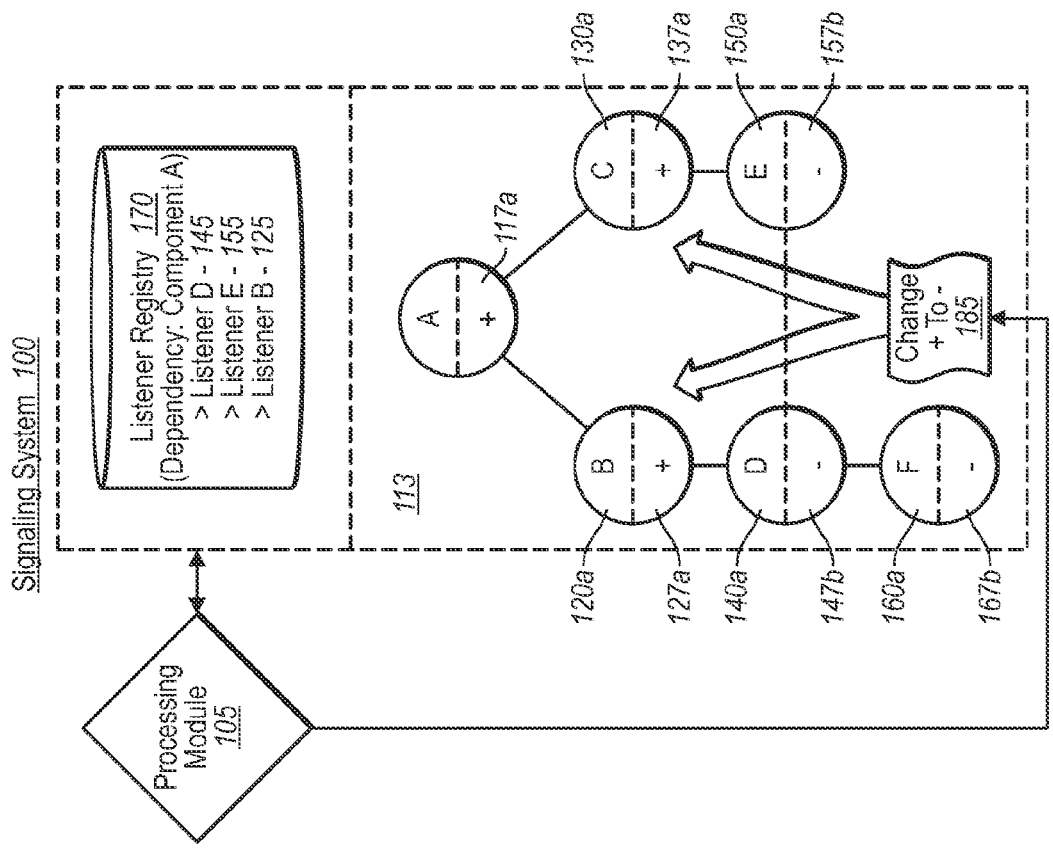
FIG. 1B illustrates an overview schematic diagram in which the signaling system signals each node in a dependency chain in accordance with an implementation of the present invention.

Along these lines, therefore, a "binary" indicator can only change to one other value, and, as discussed herein, only one time. Thus, when processing module 105 identifies a change in value to a particular software source component (e.g., 160), the binary indicators 117a, 127a, etc. are only updated once to reflect the change. For example, FIG. 1A shows that processing module 105 receives a message 180 indicating that component F 160 has been updated. As shown in FIG. 1B, processing module 105 then sends a signal 185 through each of the different nodes 110a, 120a, etc. Signal 185, in turn, includes a notation to change the binary indicators from "+" status to a "−" status, and thus simply updates the initial setting on a binary indicator to a subsequent setting.

In addition, signal 185 is sent essentially in dependency chain order starting from the source node F 160a. For example, FIG. 1B shows that signal 185 is first sent to node F 160a, then on to nodes D 140a and E 150a, and so on, which results in a change binary indicators from setting 167a, 157a, and 147a (i.e., "+") to settings 167b, 157b, and 147b (i.e., "−"), respectively. Eventually, signal 185 will pass through each dependency until all nodes in node graph 113 receive signal 185. In most cases, each node will only receive the signal one time. Implementations of the present invention, however, can accommodate cases in which a node receives a repeat of the signal (or any other signal) for any other reason, since each binary indicator nevertheless changes "at most once."

Specifically, since each binary indicator 147 can be changed only one time (i.e., "at most once"), no other signals (or repeats of a signal) can change the binary indicator of a changed/updated node. That is, with specific reference to the terms used in these Figures, once set to the illustrated "−" sign, a given binary indicator cannot be changed back to a "+" sign. Thus, the illustrated signaling pathway of node graph 113 will still work even in the event certain nodes were to inadvertently cycle a particular signal 185 back and forth. Of course, beyond configuration of the binary indicators for "at most once" changes, the nodes themselves can also be configured to avoid these kinds of problems. In at least one implementation, for example, each node of the node graph 113 is configured at creation with no back-channel to another node. Thus, though node F 160*a* relays signal 185 at least to node D 140*a*, node F 140*a* cannot accept a return signal from node D 140*a*.

System 100 further ensures that no processing within this particular dependency chain can occur until all nodes in a given node graph have been updated (via signal 185). In at least one implementation, for example, system 100 ensures this consistency by holding the calling of listeners 125, 145, or 155 until after all binary indicators have been set and updated, or until after signal 185 has reached all nodes in node graph 113 at least once. In such implementations, therefore, the initial creation of the node graph (e.g., FIG. 1A) will not result in any processing due to the mere discovery of listeners 125, 145, and 155. Even at the point where system 100 receives an update to component F (e.g., message 180), system 100 will not call any of listeners 125, 145, or 155 until the binary indicators have been updated to reflect the initial change at the source node.

In addition to calling listeners after updating all binary indicators, system 100 can further enhance consistency by calling listeners in a particular order. For example, FIGS. 1A-1C shows that the listener registry 170 stores the references to the listeners 125, 145, and 145 in essentially the order they were identified by processing module 105. In particular, FIGS. 1A-1C show that listener registry 170 stores the order of these particular listeners in order first of listener D 145, listener E 155, and listener B 125. As a result, when processing module 105 ultimately calls these particular listeners, processing module 105 only does so in approximate processing order. For example, FIG. 1C shows that processing module 105 applies message 190 through the node graph 113 in approximate dependency chain order so that listeners D 145 and E 155 corresponding to nodes D 140*a* and E 150*a* are called before listener B 125 corresponding to node B 120*a*.

As system 100 calls each of these listeners, each corresponding software component can perform processing based on the value changes at the source component. For example, once the listener 145 is called, software component D 140 can perform any processing on the cached value associated with this node graph 113 (e.g., the present value of source component F 160). Once listeners E 155 and B 125 are called, component E 150 and B 120 can retrieve any value that has already been processed and/or provided from node D, which is based on the most recent update to component F from message 180.

One will appreciate that system 100 thus orders not only the calling of each listener, but also the processing of successive values along the dependency chain. This significantly increases the likelihood that each value that a particular software component retrieves from another source/intermediate node is based only on an already-processed, most up-to-date value. Furthermore, once all listeners have been called based on the assigned state of component F 160, and all processing has completed, processing module 150 then discards node graph 113. If required, system 100 can prepare another node graph corresponding to yet another change in component F.

Accordingly, FIGS. 1A, 1B and 1C provide one or more schematics or components for ensuring that components in a dependency chain effectively process only one state change in a source node at a time, and essentially in the correct order. This can provide a number of important guarantees, and can mitigate or otherwise eliminate concerns that sometimes arise over race conditions (between processing of current and old values in the same chain) in these particular cases.

Figure 3:
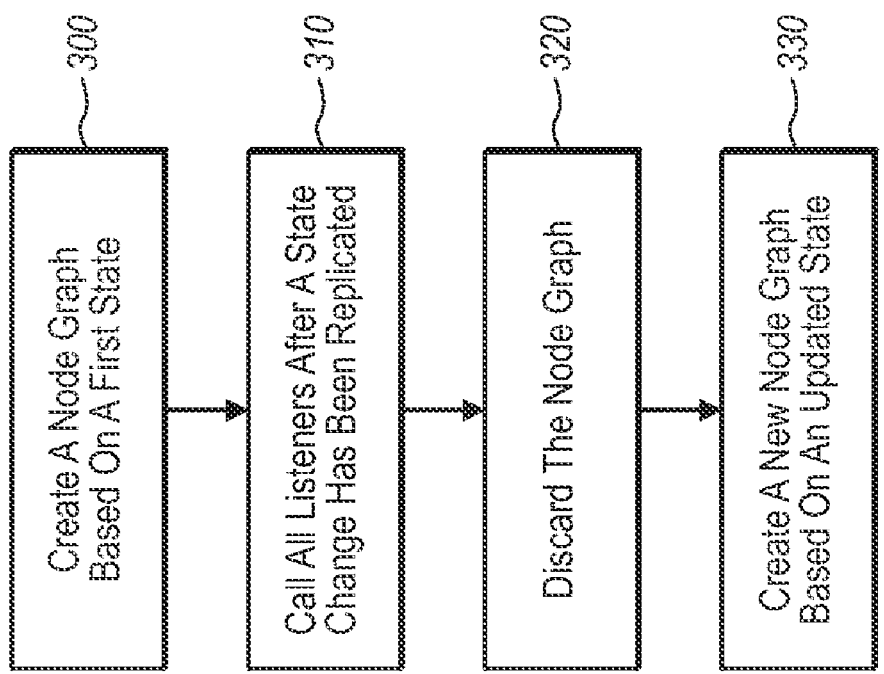
FIG. 3 illustrates a flow chart of a method for creating different dependency chain structures for insuring consistency among nodes in accordance with an implementation of the present invention.
Figure 2:
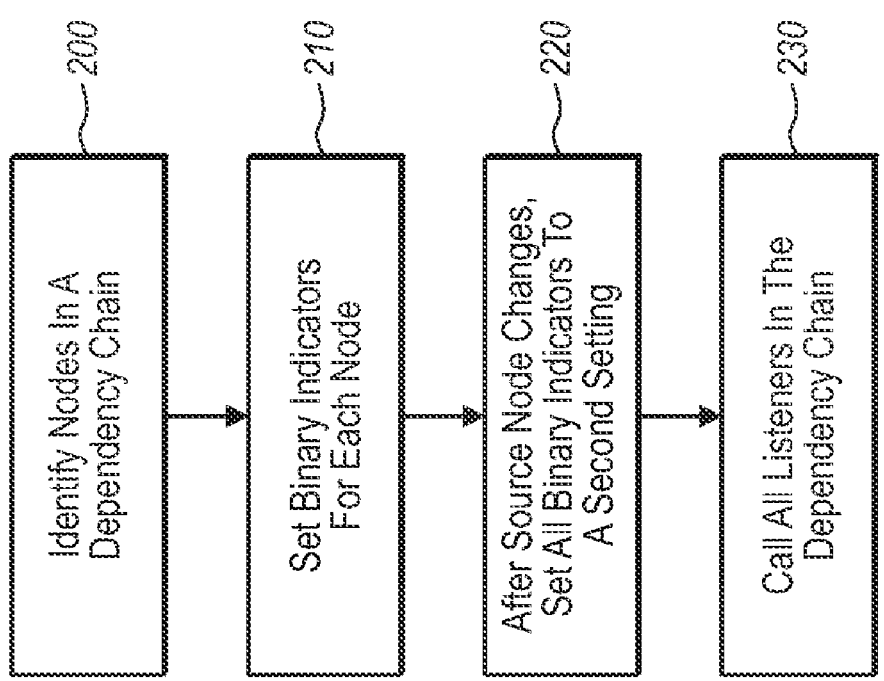
FIG. 2 illustrates a flow chart of a method in accordance with an implementation of the present invention for insuring consistency among dependent nodes in a dependency chain.

In addition to the foregoing, implementations of the present invention can also be described in terms of methods comprising one or more acts for accomplishing a particular result. For example, FIG. 2 illustrates a flowchart of a method of processing a consistent set of one or more values in a dependency chain. In addition, FIG. 3 illustrates an additional or alternative method of creating and updating in-memory data structures representing the dependency chain based only on a set of guaranteed values. The acts in the flowcharts of FIGS. 2 and 3 are described below with respect to the components and schematics of FIGS. 1A-1C.

For example, FIG. 2 illustrates that a method of processing a consistent set of one or more values in a dependency chain can comprise an act 200 of identifying nodes in a dependency chain. Act 200 includes creating a plurality of nodes corresponding to a plurality of components that include one or more source components and one or more dependent components that are ordered in a dependency chain. For example, processing module 105 receives a request for processing from component A 110, and traverse the corresponding dependency chain to identify each of the different components from which component A depends. Processing module 105 then creates a corresponding node graph 113 data structure comprising one or more nodes in the dependency chain that correlate with the identified components from which A depends.

FIG. 2 also shows that the method can comprise an act 210 of setting binary indicators for each node. Act 210 includes, for each node, setting a binary indicator to a first setting that indicates that one or more source components comprise an initial status. For example, FIG. 1A shows that processing module 105 creates and sets a binary indicator 117*a*, 127*a*, 137*a*, 147*a*, 157*a* and 167*a* for each node in node graph 113. In one implementation, this particular binary indicator is set to an initial state (165), which effectively clarifies that the value of the one or more source components (e.g., component F 160) from the time of setting up the node graph has/have not yet changed.

In addition, FIG. 2 shows that the method can comprise an act 220 of, after the source node changes, setting all binary indicators to a second setting. Act 220 includes, upon identifying a change to a subsequent status in the one or more source components, setting each binary indicator for each node to a second setting. For example, as shown in FIG. 1B, once processing module 105 identifies a change to node F, processing module 105 immediately begins signaling the change, such as by first changing each of the binary indicators in the node graph 113 to an alternate, subsequent representation. Specifically, FIG. 1B shows that processing module 105 passes signal 185 to each node in node graph 113, changing the "+" setting to a "−."

Furthermore, FIG. 2 shows that the method can comprise an act 230 of calling all listeners in the dependency chain. Act 230 includes calling one or more listeners that have been registered with the created plurality of nodes, wherein the one or more listeners are synchronized to execute based on the subsequent status in the one or more source components. For example, now that each of the binary indicators has been changed to a minus sign, FIG. 1C shows that system 100 calls each listener for each component, and does so in the order they were originally identified in the dependency chain (e.g., closest to the source node onward to closest to the end node). For example, FIG. 1C shows that system 100 first calls listener D 145, then listener E 155, and listener B 125, and so on.

In addition to the foregoing, FIG. 3 illustrates that an additional or alternative method in accordance with the present invention for generating a dependency chain based only on a set of guaranteed values can comprise an act 300 of creating a node graph based on a first state. Act 300 includes creating an initial node graph corresponding to a plurality of components that include one or more dependent components that depend from one or more source components, wherein each node of the initial node graph is set to a first setting. For example, FIG. 1A shows that processing module 105, upon identifying a processing request 180, traverses components 110, 120, 130, 140, 150, 160 to create a node graph 113 that includes corresponding nodes 110a, 120a, etc. In this case, processing module 105 further sets a binary indicator (117a, 127a, etc.) in each node to an initial state (i.e., "+"), indicating that node graph 113 is based off of an initial state (165) of the source node component F 160.

FIG. 3 also shows that the method can comprise an act 310 of calling all listeners after the state change has been replicated. Act 310 includes, upon identifying that the one or more source components have changed to an updated value, caching the updated value, and initiating all listeners registered for the initial node graph to perform processing based on the updated value. For example, FIGS. 1B and 1C show that upon receiving message 180 to update component node F, processing module 105 changes all the binary indicators in an alternate designation, such as 147b, 157b, 167b, etc. in a node graph 113 (i.e., to "−"), and further calls all listeners in registry 170.

In addition, FIG. 3 shows that the method can comprise an act 320 of discarding the node graph. Act 320 includes discarding the initial node graph after all initiated listeners have finished processing based on the updated value. For example, after each listener shown in FIG. 3 has accessed the most recent value available to node graph 113, processing module 105 discards the node graph 113. Since each of the different binary indicators 147b, 157b, etc. can only be changed once, no other subsequent changes into the different components or nodes can be replicated and handled by any of the other called listeners. Thus, system 100 discards the dependency node graph 113.

Furthermore, FIG. 3 shows that the method can comprise an act 330 of creating a new node graph based on an updated state. Act 330 includes creating a subsequent node graph based on one or more subsequent changes to the one or more source components. Thus, for example, upon receiving a new processing request by component A 110, processing module 105 could then traverse the set of dependency chains pertaining to this particular processing request again, and identify a new set of nodes pertaining to a new node graph (not shown). As with node graph 113, this new node graph would also be an in-memory data structure, albeit based on a more recent change to the corresponding source nodes. In particular, the node graph can comprise the same representations as shown in FIG. 1A, but could also comprise different components or nodes, since the execution context may be different and may have different dependencies.

One will appreciate that this creation of new node graphs and new dependency chains can be continually refreshed, recreated, and discarded as needed. In either case, implementations of the present invention thus ensure that source node value changes are processed throughout a dependency chain only one time in a particular node graph context, and in a consistent manner. Accordingly, implementations of the present invention can ensure a high degree of accuracy and consistency in value processing, even in very complex dependency chains of software components.

The embodiments of the present invention may comprise a special purpose or general-purpose computer including various computer hardware, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer.

By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a signaling system in a computerized environment, the signaling system comprising a plurality of components that relay data from one to another through a dependency chain, a method of processing a consistent set of one or more values in the dependency chain in a manner that avoids race conditions, comprising the acts of:
   creating a plurality of nodes corresponding to a plurality of components that include one or more source components and one or more dependent components that are ordered in a dependency chain;
   for each node, setting a binary indicator, to a first setting that indicates that one or more source components comprise an initial status;
   upon identifying a change to a subsequent status in the one or more source components, sending a signal to each node in the dependency chain to cause each binary indicator for each node to be set to a second setting; and
   after the binary indicator at each node is set to the second setting, calling one or more listeners that have been registered with the created plurality of nodes, wherein the one or more listeners are synchronized to execute based on the subsequent status in the one or more source components.

2. The method as recited in claim 1, wherein the second setting indicates only that the one or more source components have changed, and does not directly indicate the value to which the one or more source components have changed.

3. The method as recited in claim 1, wherein the act of setting each binary indicator to a second setting comprises an act of sending a signal to each node in the dependency chain.

4. The method as recited in claim 3, further comprising the acts of:
after setting a corresponding binary indicator in one of the nodes in the dependency chain to the second setting, subsequently receiving the signal again; and
ignoring the subsequently received signal, wherein the binary indicator remains set to the second setting.

5. The method as recited in claim 1, further comprising an act of identifying the one or more listeners when creating the plurality of nodes in the dependency chain.

6. The method as recited in claim 5, further comprising the acts of:
maintaining the identified one or more listeners in a listener registry at least until each binary indicator is changed to the second setting;
wherein the one or more listeners are called only after each binary indicator is changed to the second setting.

7. The method as recited in claim 5, further comprising an act of maintaining the one or more listeners in a listener registry in an order corresponding to the ordering of components in the dependency chain.

8. The method as recited in claim 7, wherein the act of calling one or more listeners that have been registered with the dependency chain comprises an act of calling the one or more listeners in the order maintained for the one or more listeners in the listener registry.

9. The method as recited in claim 1, further comprising the acts of:
generating an in-memory data structure comprising a node graph representing all of the created nodes and corresponding dependencies in the dependency chain; and
upon identifying the change to the subsequent status, caching an updated value of the one or more source components.

10. The method as recited in claim 9, further comprising the acts of:
generating a new in-memory data structure comprising a new version of the node graph;
upon identifying a new change to the one or more source components, caching a new value of the one or more source components.

11. The method as recited in claim 10, further comprising the acts of:
associating the cached updated value of the one or more source components with the in-memory data structure comprising the node graph; and
associating the cached new value of the one or more source components with the new in-memory data structure comprising the new version of the node graph.

12. The method as recited in claim 11, further comprising the acts of:
identifying that all of the called one or more listeners corresponding to any of the in-memory data structures comprising a node graph have finished processing; and
discarding the particular in-memory data structure.

13. At a signaling system in a computerized environment, the signaling system comprising a plurality of components that relay data from one to another through a dependency chain, a method of creating and updating in-memory data structures representing the dependency chain based only on a set of guaranteed values, comprising the acts of:
creating an initial node graph corresponding to a plurality of components that include one or more dependent components that depend from one or more source components, wherein each node of the initial node graph is set to a first setting;
upon identifying that the one or more source components have changed to an updated value, caching the updated value, and sending a signal to every node in the initial node graph, wherein the signal changes each node from the first setting to a second setting;
after each node in the initial node graph has changed from the first setting to the second setting, initiating all listeners registered for the initial node graph to perform processing based on the updated value;
discarding the initial node graph after all initiated listeners have finished processing based on the updated value; and
creating a subsequent node graph based on one or more subsequent changes to the one or more source components.

14. The method as recited in claim 13, further comprising an act of adding all of the listeners corresponding to the plurality of components in order of components in the dependency chain to a listener registry.

15. The method as recited in claim 14, wherein the listeners are initiated in the order added to the listener registry.

16. The method as recited in claim 13, further comprising an act of adding a new set of one or more listeners corresponding to the one or more source components to a listener registry, wherein the new set of one or more listeners correspond to the subsequent dependency node graph.

17. The method as recited in claim 13, wherein each node in the subsequent node graph is set to the first setting, the method further comprising the acts of:
identifying that the corresponding one or more source components have changed again to a new value; and
sending a signal to every node in the subsequent node graph upon, wherein the signal changes each node from the first setting to a second setting.

18. The method as recited in claim 17, further comprising an act of:
caching the new value; and
associating the new value with the subsequent node graph, wherein all listeners that are subsequently called on the subsequent node graph perform processing based on the new value.

19. At a signaling system in a computerized environment, the signaling system comprising a plurality of components that relay data from one to another through a dependency chain, a computer program storage product comprising computer-executable instructions that, when executed, cause one or more processors on the system to perform a method comprising:
creating a plurality of nodes corresponding to a plurality of components that include one or more source components and one or more dependent components that are ordered in a dependency chain;

for each node, setting a binary indicator, to a first setting that indicates that one or more source components comprise an initial status;

upon identifying a change to a subsequent status in the one or more source components, sending a signal to each node in the dependency chain to cause each binary indicator for each node to be set to a second setting; and after the binary indicator at each node is set to the second setting, calling one or more listeners that have been registered with the created plurality of nodes, wherein the one or more listeners are synchronized to execute based on the subsequent status in the one or more source components.

* * * * *